United States Patent [19]

Yoshinaka et al.

[11] Patent Number: 4,714,128

[45] Date of Patent: Dec. 22, 1987

[54] STOP MEMBER MECHANISM FOR USE IN A FOUR-WHEEL DRIVE VEHICLE

[75] Inventors: Toshio Yoshinaka, Nagoya; Shuji Nagano, Toyota, both of Japan

[73] Assignee: Toyota Jidosha Kabushiki Kaisha, Japan

[21] Appl. No.: 922,695

[22] Filed: Oct. 24, 1986

[30] Foreign Application Priority Data

Oct. 24, 1985 [JP] Japan ............................ 60-163254[U]

[51] Int. Cl.$^4$ .......................... G05G 5/10; F16B 21/00
[52] U.S. Cl. .................................... 180/247; 180/336; 411/517; 74/475; 74/477
[58] Field of Search ............... 180/233, 247, 249, 315, 180/336; 403/326, DIG. 7, 155; 411/522, 520, 539, 541, 517

[56] References Cited

U.S. PATENT DOCUMENTS 4,099,444  7/1978  Millheiser et al. .................. 411/517
4,290,318  9/1981  Ookubo et al. ...................... 74/477
4,569,247  2/1986  Inui et al. .............................. 74/477

FOREIGN PATENT DOCUMENTS 58-146963  10/1983  Japan.

Primary Examiner—John J. Love
Assistant Examiner—Donn McGiehan
Attorney, Agent, or Firm—Parkhurst & Oliff

[57] ABSTRACT

The present invention relates to a stop member which is used in a four-wheel vehicle drive system in an automotive vehicle. Particularly, the stop member includes a tentative holding portion which provides for temporary alignment of members of the transmission, and a firmly gripping portion which firmly holds members of the transmission together once they are appropriately aligned. Specifically, the stop member includes a pair of legs for the tentative holding portion and an enclosed area for the firmly gripping portion. The firmly gripping portion of the stop member contacts with a fork shaft in the transmission to hold the fork shaft at a fixed position.

6 Claims, 33 Drawing Figures

Fig. 20
Fig. 22
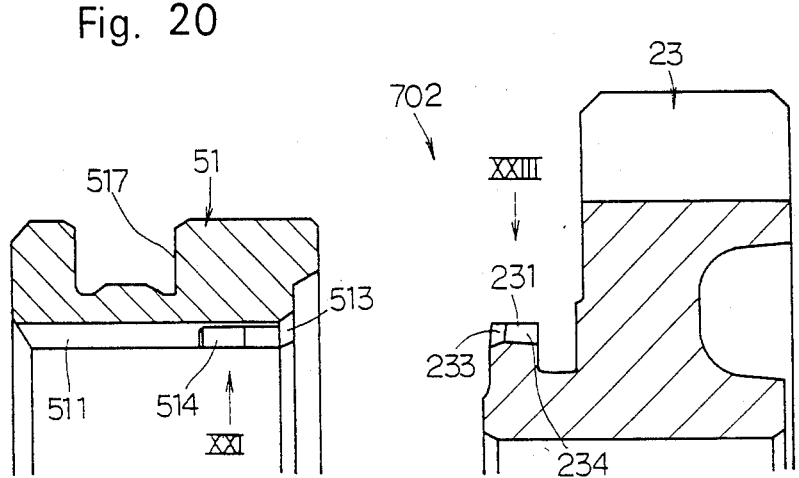
Fig. 21
Fig. 23
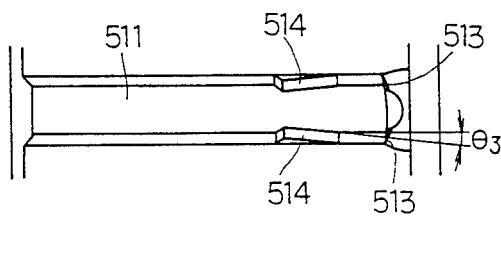
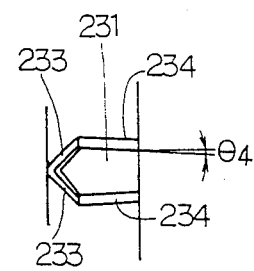

Fig. 24   Fig. 25   Fig. 26
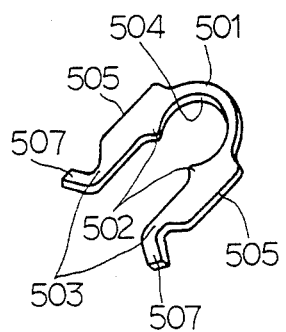# 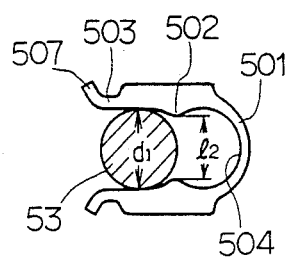 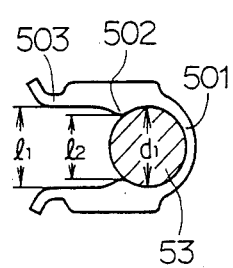
Fig. 27   Fig. 28   Fig. 29
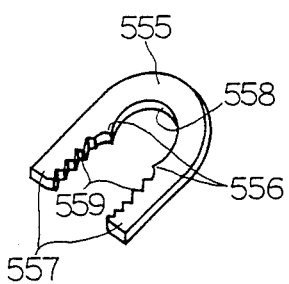 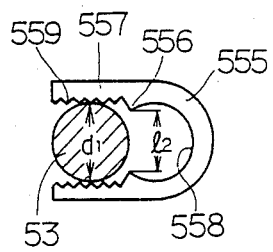 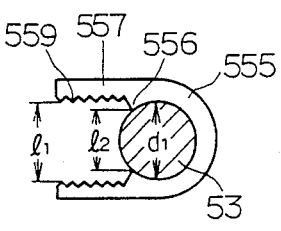

PRIOR ART

STOP MEMBER MECHANISM FOR USE IN A FOUR-WHEEL DRIVE VEHICLE

BACKGROUND OF THE INVENTION

The present invention relates to a stop member mechanism for use in a four-wheel drive vehicle having at least front and rear pairs of road wheels. More particularly, the present invention relates to improvements in the stop member for assembling a shift fork to a transfer gear shift mechanism which is used for shifting from a four-wheel driving condition to a two-wheel driving condition.

Conventional stop members for assembling a shift fork to a transfer gear shift mechanism are disclosed in FIGS. 30 and 31. Each of these conventional stop members 595 and 597 includes a pair of inner projections 596 or 598. Accordingly, the pair of inner projections 596 form a narrow inlet in the stop member 595 and the pair of inner projections 598 form a narrow inlet in the stop member 597.

When the stop member 595 is assembled on a fork shaft 539, as shown in FIGS. 32 and 33, the stop member 595 is firmly fixed on the fork shaft 539. After the stop member 595 is fixed on the fork shaft 539, a shift fork 54 is then simultaneously moved with sleeves in order to check for smooth movements of the shift fork 54 and the sleeves.

However, when the shift fork 54 and the sleeves do not move smoothly, the stop member 595 must be removed from the fork shaft 539 in order to adjust spatial relationships between the stop member 595, a spring 58, the shift fork 54 and the sleeves. And the stop member 595 must then again be assembled to the fork shaft 539.

As a result, the removal and subsequent reassembly of the stop member 595 consumes a substantial amount of time and effort.

SUMMARY OF THE INVENTION

The present invention was developed in view of the foregoing background and to overcome the foregoing drawbacks. It is accordingly an object of this invention to provide a stop member mechanism to facilitate assembly of a four-wheel vehicle drive mechanism including a four-two wheel drive shift mechanism.

To attain easy assembly of the four-wheel vehicle drive mechanism, the four-wheel drive mechanism comprises a first spline member, a second spline member, an engagement sleeve member, a shaft member, a fork member, a biasing means and a stop member. The four-wheel drive mechanism is used in a vehicle which includes first and second pairs of road wheels, an engine including an output shaft, and a transmission including input and output shafts. The input shaft of the transmission is selectively connected to the output shaft of the engine and the output shaft of the transmission selectively is in driving engagement with the input of the transmission.

The first spline member is rotatable about a first rotational axis and the first spline member is driven by the output shaft of the transmission.

The second spline member is rotatable about the first rotational axis of the first spline member and the second spline member is located adjacent to the first spline member. The second spline member includes a first engagement means.

The engagement sleeve member is slidably mounted on the first spline member and the engagement sleeve member includes a second engagement means. The second engagement means of the engagement sleeve member selectively engages with the first engagement means of the second spline member. The engagement sleeve member is selectively positioned at one of a first spline engagement position and a first spline disengagement position.

The shaft member is located parallel to the first rotational axis of the first spline member and the shaft member is selectively positioned at one of a first position and a second position. The first position of the shaft member corresponds to the first spline engagement position of the engagement sleeve member and the second position of the shaft member corresponds to the first spline disengagement position of the engagement sleeve member. The shaft member also includes a projection.

The fork member is slidably mounted on the shaft member and the fork member has an engagement finger. The engagement finger engages with the engagement sleeve member and the fork member is selectively positioned at one of a third position and a fourth position. The third position of the fork member corresponds to the first position of the shaft member and the fourth position of the fork member corresponds to the second position of the shaft member.

The biasing means is in contact with the fork member and the biasing means forces the fork member to move to the projection of the shaft member.

The stop member is secured to the shaft member. The stop member is in contact with the biasing means, so that the baising means is located between the fork member and the stop member. The stop member includes a tentative holding portion and a firmly gripping portion, so that when the tentative holding portion of the stop member is in contact with the shaft member, the stop member is positioned at a tentative position and when the firmly gripping portion of the stop member is in contact with the shaft member, the stop member is positioned at a fixed position, whereby when the stop member is positioned at the tentative position, the stop member can be easily removed from the shaft member to adjust spatial relationships between the engagement sleeve member, the fork member, the biasing means and the shaft member; and when the stop member is positioned at the fixed position, the stop member is firmly secured to the shaft member to prevent the engagement sleeve member, the fork member, the biasing means and the shaft member from changing the spatial relationship therebetween.

BRIEF DESCRIPTION OF THE DRAWINGS

The above objects, features and advantages of the present invention will become more apparent from the description of the invention which follows, taken in conjunction with the accompanying drawings, wherein like reference numerals denote like elements;

FIG. 20 is a further enlarged cross-sectional view of the second engagement sleeve which engages with a drive sprocket wheel;

FIG. 21 is an internal plane view of the second engagement sleeve shown in FIG. 20, as viewed from XXI in FIG. 20;

FIG. 22 is a further enlarged cross-sectional view of the drive sprocket wheel which engages with the second engagement sleeve shown in FIG. 20;

FIG. 23 is a top plan view of the drive sprocket wheel shown in FIG. 22, as viewed from XXIII in FIG. 22;

FIG. 24 is an enlarged perspective view showing a second embodiment of a stop member according to the present invention;

FIG. 25 is a cross-sectional view of a second fork shaft taken along the line X—X in FIG. 8, wherein the stop member shown in FIG. 24 is positioned at the tentative position;

FIG. 26 is a cross-sectional view of the second fork shaft taken along the line XI—XI in FIG. 7, wherein the stop member shown in FIG. 24 is positioned at the fixed position;

FIG. 27 is an enlarged perspective view showing a third embodiment of a stop member according to the present invention;

FIG. 28 is a cross-sectional view of a second fork shaft taken along the line X—X in FIG. 8, wherein the stop member shown in FIG. 27 is positioned at the tentative postion;

FIG. 29 is a cross-sectional view of the second fork shaft taken along the line XI—XI in FIG. 7, wherein the stop member shown in FIG. 27 is positioned at the fixed position;

DETAILED DESCRIPTION OF THE PREFERRED EMBODIMENTS

The present invention will be described in detail with reference to the accompanying drawings which illustrate different embodiments according to the present invention.

Figure 1:
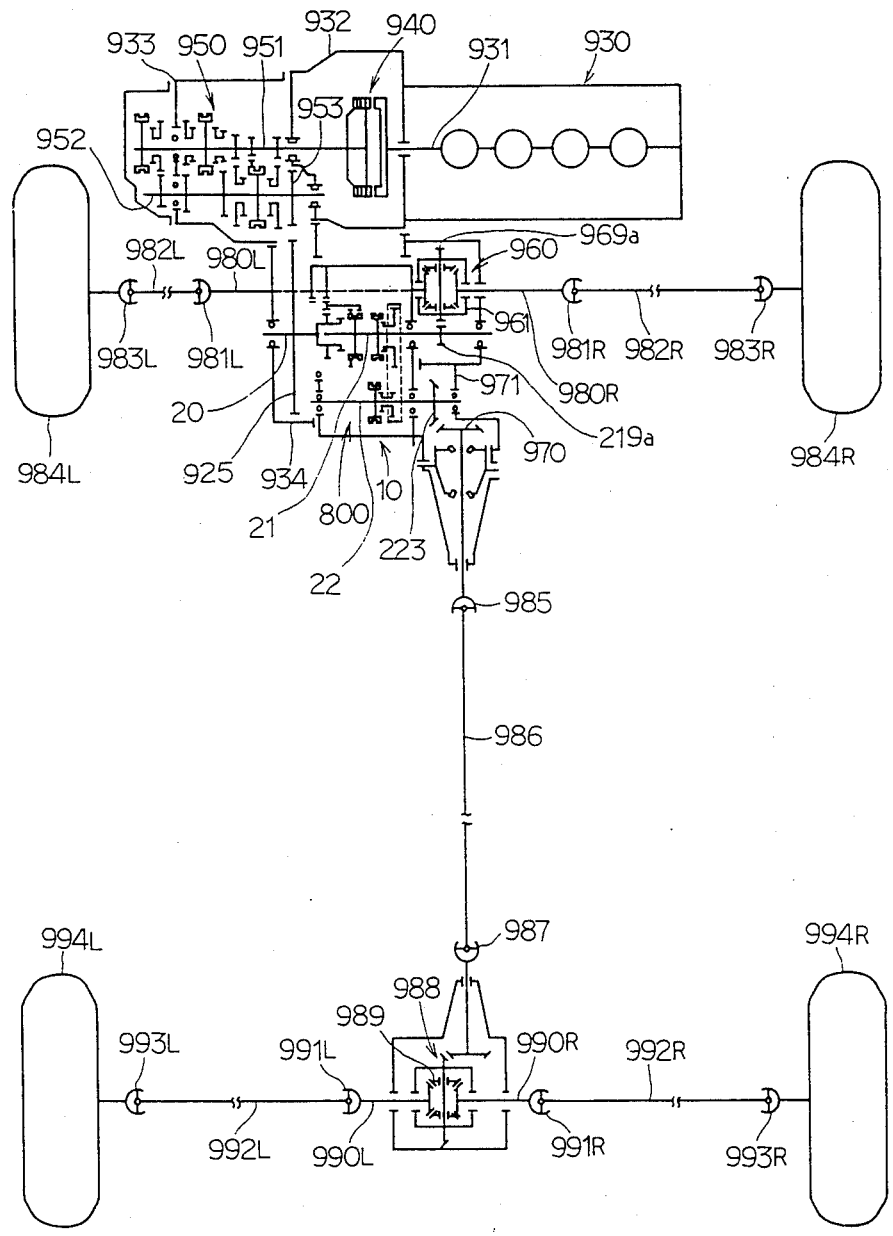
FIG. 1 is a schematic plane view showing a preferred embodiment of a four-wheel drive system according to the present invention.

Referring to FIG. 1, an engine 930 is located at a front portion of a vehicle and a crankshaft 931 of the engine 930 is located parallel to the lateral direction of the vehicle. A transmission unit 950 is located at the front portion of the vehicle and an input shaft 951 of the transmission unit 950 is located on an extended portion of a rotational center axis of the crankshaft 931. The input shaft 951 is located within a transmission casing 933, and a clutch housing 932 is located between the transmission casing 933, and the engine 930. A clutch 940 is located within the clutch housing 932, and the clutch 940 has a center axis which is located on the extended portion of the rotational center axes of the crankshaft 931 and the input shaft 951. An output shaft 952 of the transmission unit 950 is located within the transmission casing 933, and the output shaft 952 is parallel to the input shaft 951. The input shaft 951 and the output shaft 952 are rotatably mounted on the transmission casing 933. An output gear 953 is secured to the output shaft 952, and the output gear 953 engages with a final reduction gear 925 which is secured to a first input shaft 20 of a transfer gear shift mechanism 800.

Figure 4:
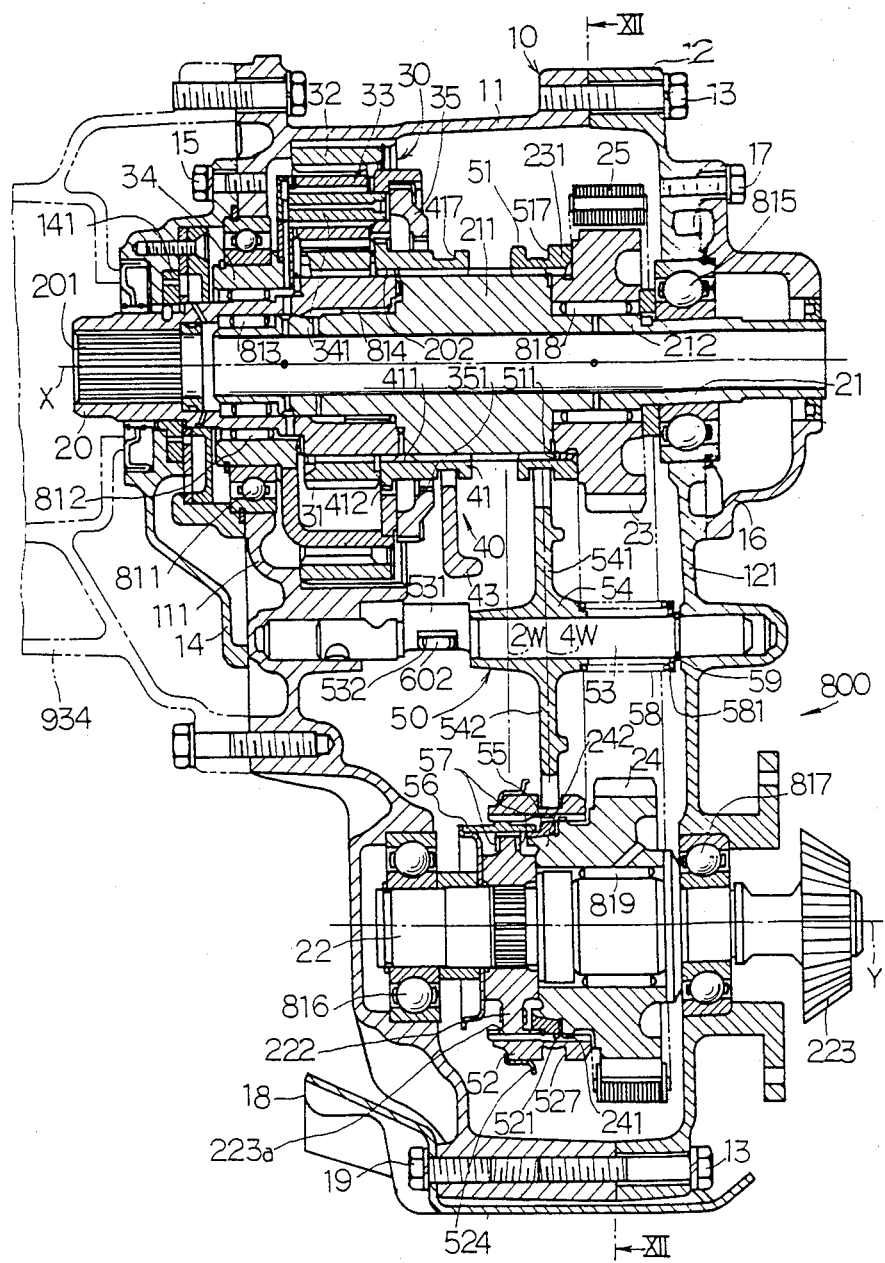
FIG. 4 is an enlarged cross-sectional view of the transfer casing taken along the line IV—IV in FIG. 2.

As shown in FIG. 4, the transfer gear shift mechanism 800 includes the first input shaft 20, a second input shaft 21, an output shaft 22, a driving sprocket wheel 23, a chain 25, an epicycle reduction gear unit 30, a high-low speed shift mechanism 40 and a two-four wheel drive shift mechanism 50.

Further, as shown in FIG. 1, a first helical gear 219a is secured to the second input shaft 21 and the first helical gear 219a engages with a peripheral gear 969a which is secured to a front wheel differential gear assembly 960.

The front wheel differential gear assembly 960 has a rotational center axis which coincides with rotational center axes of front axles 980L and 980R. An inner end of the left front axle 980L is connected to a front first side gear of the front wheel differential gear assembly 960 and an outer end of the left front axle 980L is connected to a first constant velocity or universal coupling unit 981L. An inner end of a left output axle 982L is connected to the first constant velocity coupling unit 981L and an outer end of the left output axle 982L is connected to a left front wheel 984L through a second constant velocity coupling unit 983L.

In a similar manner, the right front axle 980R is connected to a front second side gear of the front wheel differential gear assembly 960 and a first constant velocity coupling unit 981R. An inner end of a right output axle 982R is connected to the first constant velocity coupling unit 981R and an outer end of the right output axle 982R is connected to a right front wheel 984R through a second constant velocity coupling unit 983R.

The front wheel differential gear assembly 960 is located within a second adapter casing 971 and the second adapter casing 971 is secured to the right side of a transfer casing 10. A transfer gear shift mechanism 800 is located within the transfer casing 10, which is shown in detail in FIGS. 2 and 4. A first adapter casing 934 is secured to the left side of the transfer casing 10. A right-angle power transfer gear mechanism 970 is covered with the second adapter casing 971, and the right-angle power transfer gear mechanism 970 engages with a second bevel gear 223 of the transfer gear shift mechanism 800. The right angle power transfer gear mechanism 970 is connected to a first universal coupling unit 985. A front end of a propeller shaft 986 is connected to the first universal coupling unit 985 and a rear end of the propeller shaft 986 is connected to a rear final reduction gear 988 through a second universal coupling unit 987. The propeller shaft 986 is located in the vicinity of the longitudinal center line of the vehicle.

The rear final reduction gear 988 engages with a rear wheel differential gear assembly 989, and the rear wheel differential gear assembly 989 includes a pair of side bevel gears.

A right end of a left rear shaft 990L is connected to one of the side bevel gears of the rear wheel differential gear assembly 989 and a left end of the left rear shaft 990L is connected to a first rear constant velocity coupling unit 991L. A right end of a left rear output axle 992L is connected to the first rear constant velocity coupling unit 991L and a left end of the left rear output axle 992L is connected to a left rear wheel 994L through a second rear constant velocity coupling unit 993L.

In a similar manner, a right rear shaft 990R is connected to another one of the side bevel gears of the rear wheel differential gear assembly 989 and to a first rear constant velocity coupling unit 991R. A right rear output axle 992R is connected to the first rear constant velocity coupling unit 991R and to the right rear wheel 994R through a second rear constant velocity coupling unit 993R.

In the vertical direction of the vehicle, the crankshaft 931 of the engine 930 and the input shaft 951 of the transmission unit 950 are located at a first vertical level which is higher than a second vertical level at which the output shaft 952 of the transmission unit 950 is located.

The first and second input shafts 20 and 21 of the transfer gear shift mechanism 800 are located at a third vertical level which is lower than the second vertical level of the output shaft 952 of the transmission unit 950.

The left and right front axles 980L and 980R and a driven gear shaft of the right-angle power transfer gear mechanism 970 are located at a fourth vertical level which is lower than the third vertical level of first and second input shafts 20 and 21.

Figure 3:
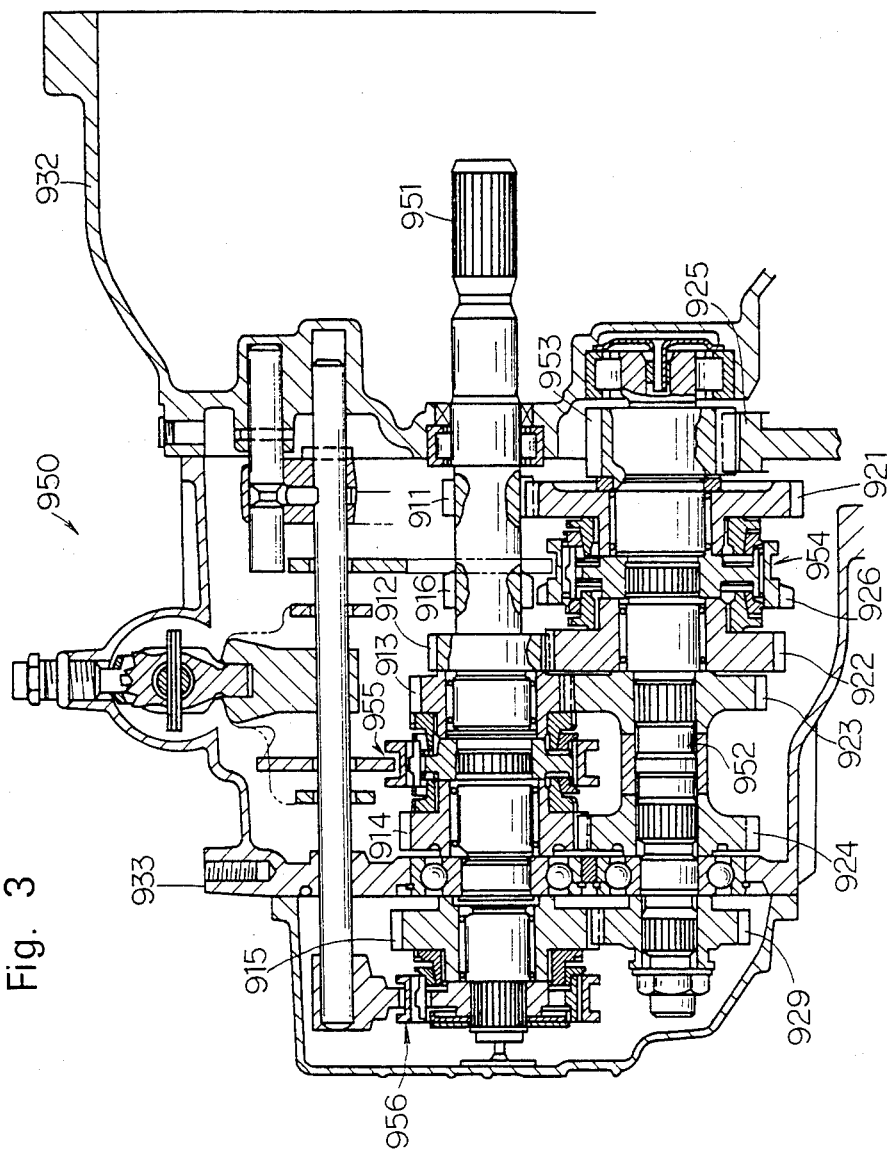
FIG. 3 is an enlarged cross-sectional view of a transmission of the four-wheel drive system shown in FIG. 1.

As shown in FIG. 3, the transmission unit 950 includes the input shaft 951 and the output shaft 952. The input shaft 951 and the output shaft 952 are rotatably mounted, respectively, on a first portion of the transmission casing 933 by bearings. An edge of the first portion of the transmission casing 933 is secured to the clutch housing 932, and an opposite edge of the first portion is secured to a second portion of the transmission casing 933. The input shaft 951, and the output shaft 952 are also rotatably mounted, respectively, on the clutch housing 932 by bearings.

A first driving gear 911, a second driving gear 912 and a reverse driving gear 916 are integrally secured to the input shaft 951; and a third driving gear 913, a fourth driving gear 914 and a fifth driving gear 915 are rotatably mounted on the input shaft 951. The reverse driving gear 916 is located between the first driving gear 911 and the second driving gear 912. The fourth driving gear 914 is located between the third driving gear 913 and the fifth driving gear 915. The third driving gear 913 is located on an outer side of the second driving gear 912. A first driven gear 921 and a second driven gear 922 are rotatably mounted on the output shaft 952, and a third driven gear 923, a fourth driven gear 924 and a fifth driven gear 929 are integrally secured to the output shaft 952. The first driving gear 911 engages with the first driven gear 921, and the second driving gear 912 engages with the second driven gear 922. The third driving gear 913 engages with the third driven gear 923, and the fourth driving gear 914 engages with the fourth driven gear 924. The fifth driving gear 915 engages with the fifth driven gear 929, and the reverse driving gear 916 engages with the reverse driven gear 926.

A first synchronizer clutch assembly 954 is mounted between the first driven gear 921 and the second driven gear 922 on the output shaft 952, and a reverse driven gear 926 is integrally secured to a sleeve of the first synchronizer clutch assembly 954. A second synchronizer clutch assembly 955 is mounted between the third driving gear 913 and the fourth gear 914 on the input shaft 951, and a third synchronizer clutch assembly 956 is mounted on an end of the input shaft 951 and on an outer side of the fifth driving gear 915. The output gear 953 is mounted in the vicinity of an inner end of the output shaft 952 and on an inner side of the first driven gear 921. The output gear 953 engages with the final reduction gear 925, and the final reduction gear 925 is secured to a differential gear housing 961 of the front wheel differential gear assembly 960 by a bolt. The front wheel differential gear housing 961 includes a first portion and a second portion. As shown in FIG. 1, the front wheel differential gear housing 961 is rotatably mounted on the first adapter casing 934 through bearings, and the front wheel differential gear assembly 960 has a rotational center axis "X" which coincides with the rotational axes of the front axles 980L and 980R.

As shown in FIG. 4, the transfer casing 10 includes a left casing 11 and a right casing 12 which is secured to the left casing 11 by a plurality of bolts 13. A pump body 14 is secured to a left wall 111 of the left casing 11 by a plurality of bolts 15, and an extension housing 16 is secured to a right wall 121 of the right casing 12 by a bolt 17. The first adapter casing 934 is secured to the left wall 111 of the left casing 11, and the first adapter casing 934 is located between the transfer casing 10 and the transmission casing 933. A protector plate 18 is secured to a bottom of the transfer casing 10 by a pair of bolts 19, so that the protector plate 18 prevents the transfer casing 10 from being damaged by projections extending from the road surface, rocks and other debris. The bolt 19 is inserted from the opposite direction in the same bolt hole as the bolt 13.

Figure 2:
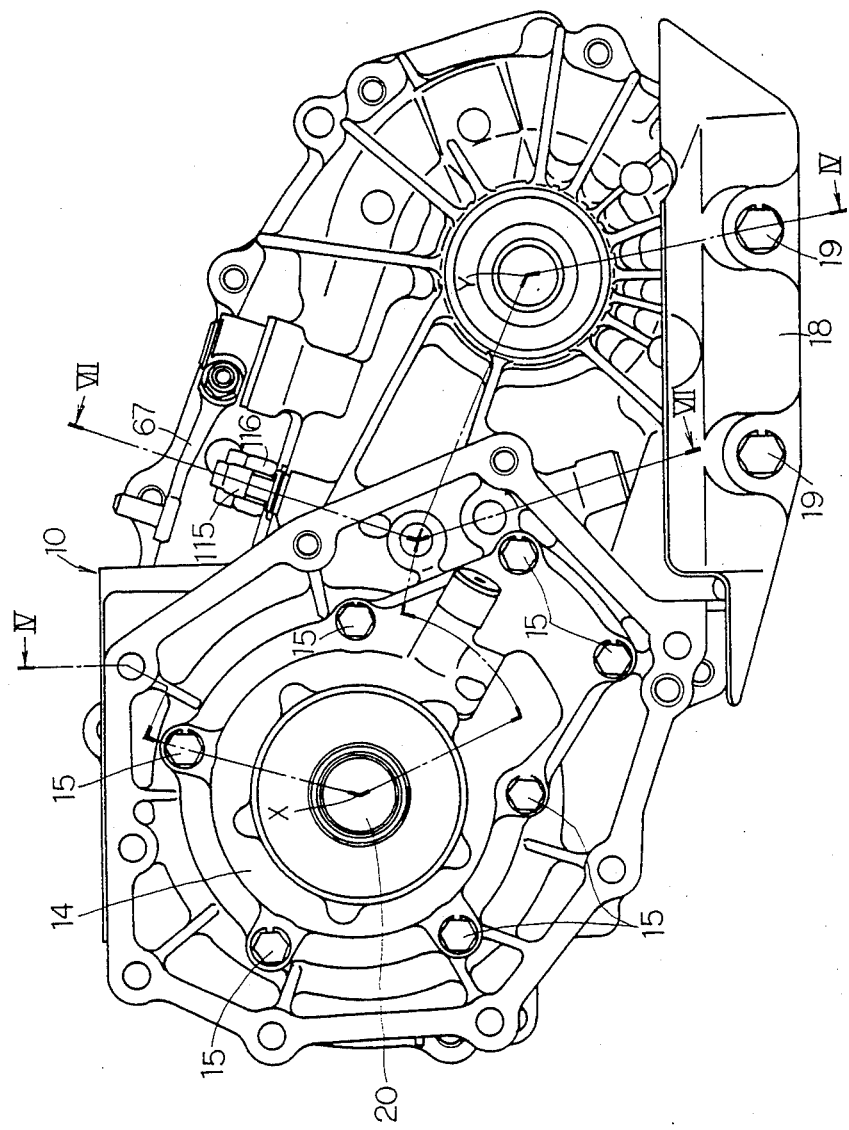
FIG. 2 is an enlarged front elevation view of a transfer casing of the four-wheel drive system shown in FIG. 1.

In FIG. 2, "X" represents the central axis of the first input shaft 20 and the second input shaft 21, and "Y" represents a central axis of the output shaft 22. The central axis "Y" is located lower than the central axis "X" in the vertical direction of the vehicle.

In FIG. 4, the first input shaft 20 is rotatably mounted on an inner surface of a planet carrier 34 of the epicycle reduction gear unit 30 by bearings 812, and the planet carrier 34 is rotatably mounted on the left wall 111 of the transfer casing 10 by bearings 811. The first input shaft 20 includes an inner spline 201 on a left side inner surface thereof, and the inner spline 201 engages with an outer spline of the front wheel differential gear housing 961. Accordingly, the rotation of the final reduction gear 925 is transmitted to the planet carrier 34 of the epicycle reduction gear unit 30.

Further, the first input shaft 20 includes an outer spline 202 on a right side outer surface thereof, and an oil pump 141 is secured to a left side outer surface of the first input shaft 20. The oil pump 141 is located within the pump body 14.

Figure 6:
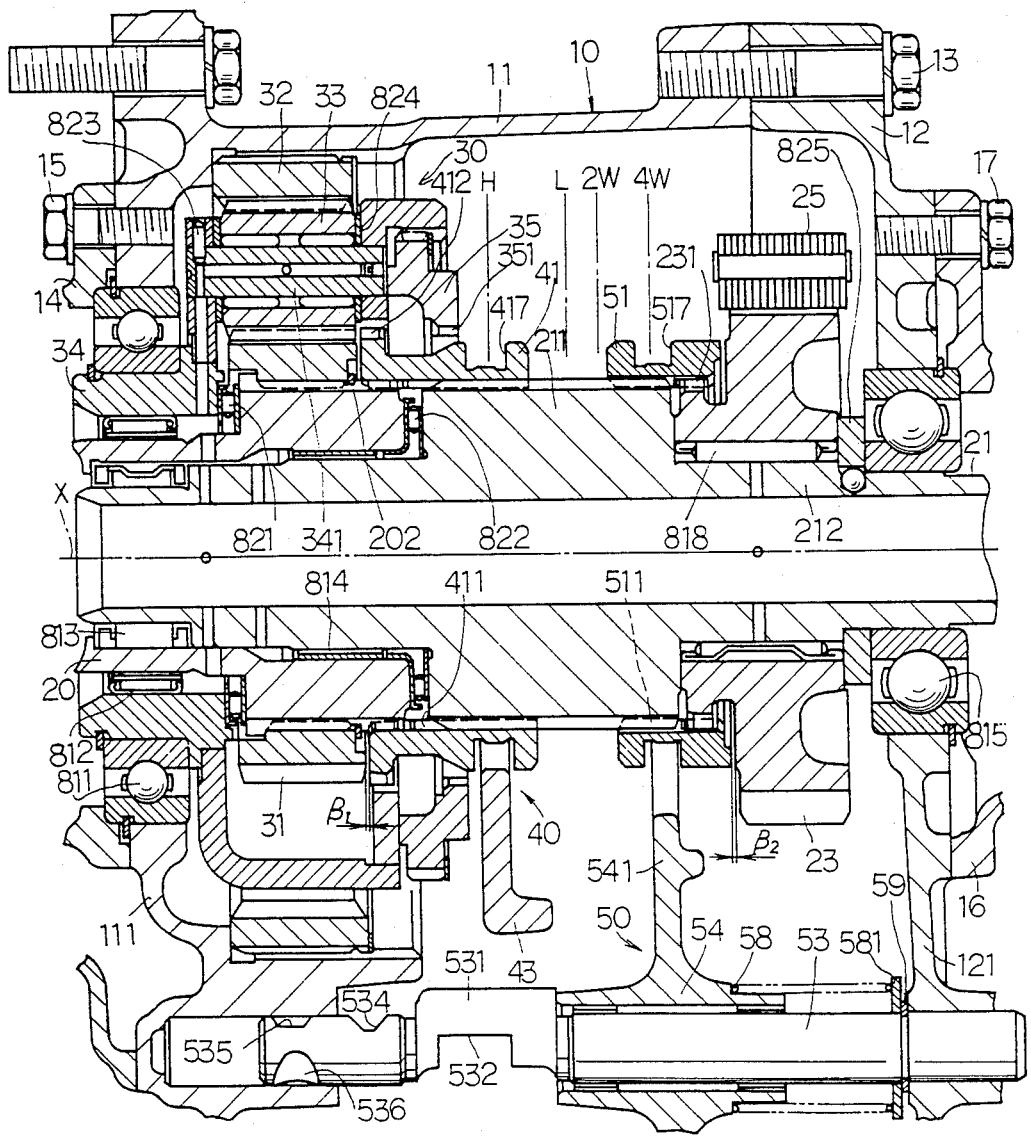
FIG. 6 is a further enlarged cross-sectional view of components of a high-low speed drive shaft mechanism and a two-four wheel drive shift mechanism shown in FIG. 4, wherein a first engagement sleeve of the high-low speed drive shift mechanism is positioned in a high speed drive condition and a second engagement sleeve of the two-four wheel drive shift mechanism is positioned in a four-wheel drive condition.

The second input shaft 21 is coaxial with the first input shaft 20, and the second input shaft 21 has a hollow portion therewithin. As shown in FIG. 6, a left portion of the second input shaft 21 is rotatably mounted on a right side inner surface of the first input shaft 20 by bearings 813 and 814, and a right portion of the second input shaft 21 is rotatably mounted on the right wall 121 of the transfer casing 10 by a bearing 815. The second input shaft 21 includes an intermediate spline hub 211, which has a large diameter portion, and a small diameter portion 212, the small diameter portion 212 being located at the right side of the intermediate spline hub 211.

In FIG. 4, the output shaft 22 is rotatably mounted on the left and right walls 111 and 121 by bearings 816 and 817, respectively, and the output shaft 22 is located parallel to the first and second input shafts 20 and 21. The bevel driving gear 223 is secured to a right end of the output shaft 22, and the bevel driving gear 223 engages with a bevel driven gear of the right-angle power transfer gear mechanism 970.

The driving sprocket wheel 23 is rotatably mounted on the small diameter portion 212 of the second input shaft 21 by a bearing 818, and the driving sprocket wheel 23 is located between the intermediate spline hub 211 of the second output shaft 21 and the bearing 815. A driven sprocket wheel 24 is rotatably mounted on the output shaft 22 by a bearing 819, and the driven sprocket wheel 24 engages with the chain 25 so that the rotation of the driving sprocket wheel 23 is transmitted to the driven sprocket wheel 24 by the chain 25.

The epicycle reduction gear unit 30 is an element of a high-low speed shift mechanism 40, which includes a sun gear 31, an annulus 32, a plurality of planet gears 33 and the planet carrier 34. The sun gear 31 engages with the outer spline 202 of the first input shaft 20, and the sun gear 31 is securely mounted on the first input shaft 20 so that the sungear 31 cannot slide on the first input shaft 20 in the axial direction of the first input shaft 20. The annulus 32 is secured to an inner surface of the left casing 11 of the transfer casing 10, and the annulus 32 is coaxial with the sun gear 31. The plurality of planet gears 33 engage with both the sun gear 31 and the annulus 32, and the plurality of planet gears 33 are rotatably mounted on the planet carrier 34. The planet carrier 34 is rotatably mounted on the first input shaft 20, and the axial movement of the planet carrier 34 is limited. Accordingly, each planet gear 33 rotates about one of a plurality of shafts 341 of the planet carrier 34, and about the central axis "X" of the planet carrier 34. The axial movement of each planet gear 33 is limited.

A gear plate 35 is secured to a right side of the planet carrier 34 and the gear plate 35 rotates with the planet carrier 34 about the central axis "X". The gear plate 35 includes an inner spline 351 which selectively engages with an outer spline 412 of a first engagement sleeve 41 of the high-low speed shift mechanism 40. When the first engagement sleeve 41 is moved to the right in FIG. 6, the outer spline 412 engages with the inner spline 351 of the gear plate 35. As a result, the rotation of the first input shaft 20 is reduced by the epicycle reduction gear unit 34, and then the reduced rotation is transmitted to the second input shaft 21 through the gear plate 35 and the first engagement sleeve 41.

The high-low speed shift mechanism 40 further includes a first fork shaft 42 (FIG. 7) and a first shift fork 43. The first engagement sleeve 41 includes an inner spline 411, the outer spline 412 and an annular groove 417. The inner spline 411 of the first engagement sleeve 41 engages with an outer spline of the intermediate spline hub 211, and the first engagement sleeve 41 is slidably mounted on the intermediate spline hub 211 of the second input shaft 21. The inner spline 411 engages selectively with the outer spline 202 of the first input shaft 20, so that when the first engagement sleeve 41 is moved to the left in FIG. 6, the inner spline 411 engages with the outer spline 202 of the first input shaft 20. Concurrently, the outer spline 412 of the engagement sleeve 41 is spaced apart from the inner spline 351 of the gear plate 35. Accordingly, the rotation of the first input shaft 20 is not reduced by the epicycle reduction gear unit 30 and the rotation of the first input shaft 20 is transmitted to the second input shaft 21 through only the first engagement sleeve 41.

Therefore, when the first engagement sleeve 41 is positioned in a high-speed driving condition "H", as shown in FIG. 6, the second input shaft 21 rotates with the first input shaft 20 at a high speed. Conversely, when the first engagement sleeve 41 is positioned in a low-speed driving condition "L", as shown in FIG. 6, the inner spline 411 of the first engagement sleeve 41 is spaced apart from the outer spline 202 of the first input shaft 20 and the outer spline 412 of the first engagement sleeve 41 engages with the inner spline 351 of the gear plate 35. As a result, the second input shaft 21 rotates with the first input shaft 20 at a low speed through the epicycle reduction gear unit 30.

Figure 7:
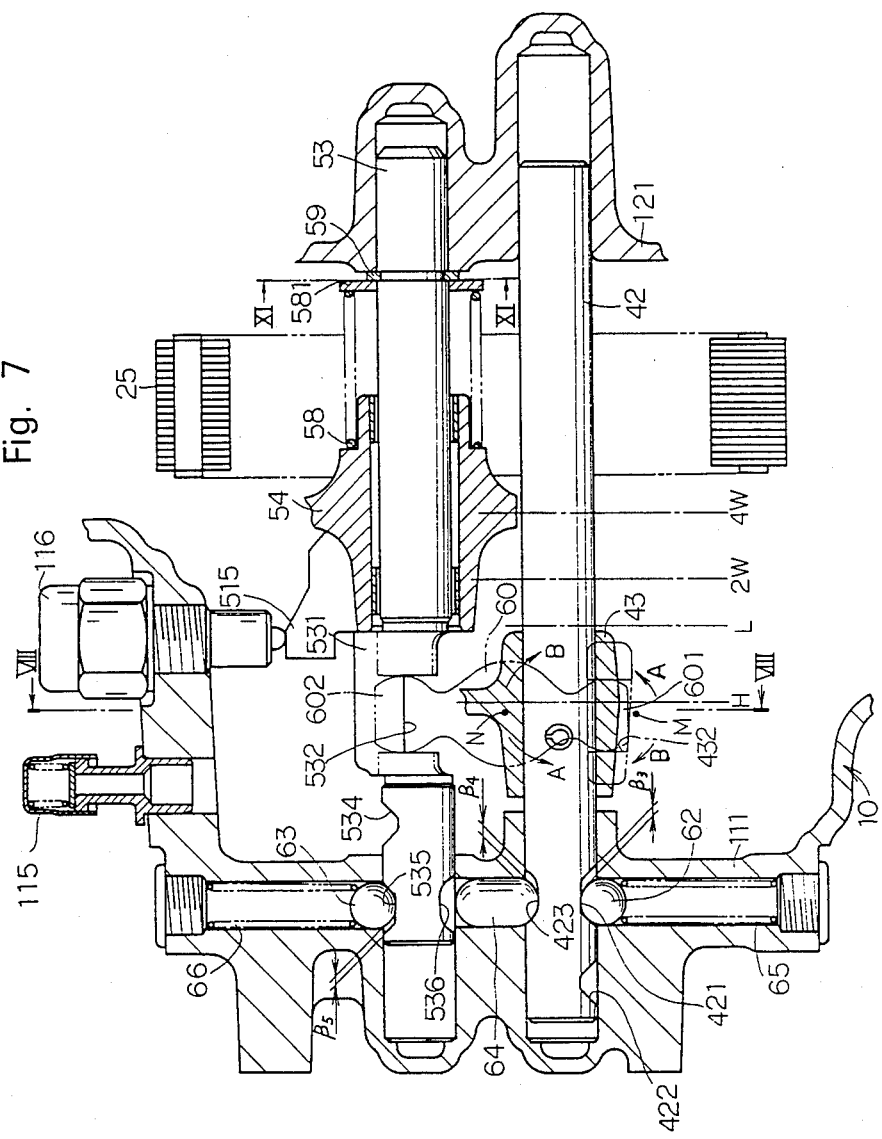
FIG. 7 is a further enlarged cross-sectional view of the components of the high-low speed drive shift mechanism and the two-four wheel drive shaft mechanism taken along the line VII—VII in FIG. 2, wherein a first fork shaft of the high-low speed drive shift mechanism is positioned in the high speed drive condition, a second fork shaft of the two-four wheel drive shift mechanism is positioned in the four wheel drive condition, and the stop member is positioned at a fixed position.
Figure 12:
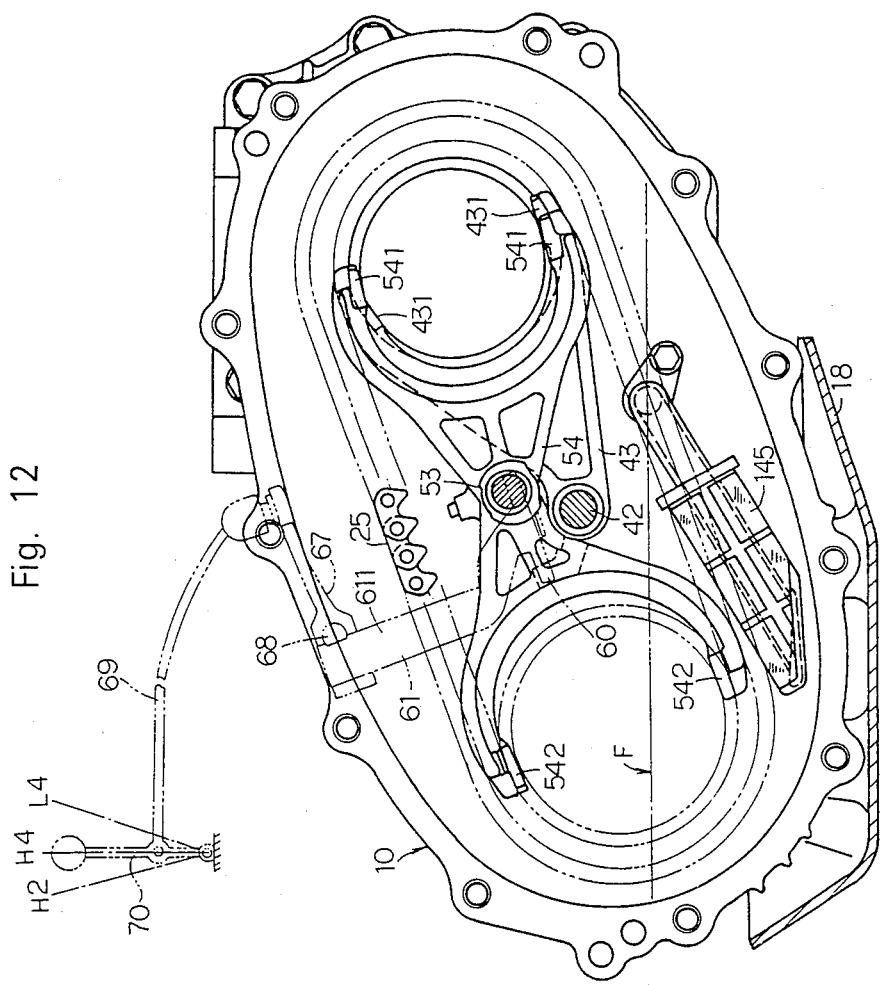
FIG. 12 is an enlarged cross-sectional view of the transfer casing taken along the line XII—XII in FIG. 4.

As shown in FIG. 7, the first fork shaft 42 of the high-low speed shift mechanism 40 is located between the second input shaft 21 and the output shaft 22, and the first fork shaft 42 is located parallel to both the second input shaft 21 and the output shaft 22. The first fork shaft 42 is slidably mounted on both the left wall 111 and the right wall 121 of the transfer casing 10, and the first shift fork 43 is secured to an intermediate portion of the first fork shaft 42. As shown in FIG. 12, the first shift fork 43 includes a pair of engagement fingers 431 which engage with the annular groove 417 of the first engagement sleeve 41. When the first fork shaft 42 is moved by a swing arm 60 in the axial direction thereof, the first fork shaft 42 forces the first engagement sleeve 41 to move in the axial direction of the first fork shaft 42.

As shown in FIG. 4, a two-four wheel drive shift mechanism 50 includes a second engagement sleeve 41, a third engagement sleeve 52, a second fork shaft 53 and a second shift fork 54. The second engagement sleeve 51 includes an inner spline 511 and an annular groove 517, and the inner spline 511 engages with the outer spline of the intermediate spline hub 211 of the second input shaft 21. The second engagement sleeve 51 is slidably mounted on the intermediate spline hub 211, and the second engagement sleeve 51 engages selectively with an outer spline 231 of the driving sprocket wheel 23.

Accordingly, when the second engagement sleeve 51 is positioned in a four wheel driving condition "4W", as shown in FIG. 6 (i.e., the second engagement sleeve 51 is moved to the right as shown in FIGS. 4 and 6), the inner spline 511 engages with both the outer spline of the intermediate spline hub 211 of the second input member 21 and the outer spline 231 of the driving sprocket wheel 23. As a result, the second input shaft 21 rotates with the driving sprocket wheel 23 and the rotation of the second input shaft 21 is transmitted to the driving sprocket wheel 23 and the chain 25.

Moreover, when the second engagement sleeve 51 is positioned in a two wheel driving condition "2W", as shown in shown in FIG. 6 (i.e., the second engagement sleeve 51 is moved to the left), the second engagement sleeve 51 is spaced apart from the driving sprocket wheel 23. As a result, the driving sprocket wheel 23 and the chain 25 are not driven.

The third engagement sleeve 52 includes an inner spline 521 and an annular groove 527. The inner spline 521 engages with an outer spline 223a of a clutch hub 222, which is securely mounted on the output shaft 22. The third engagement sleeve 52 is slidably mounted on the clutch hub 222, and the inner spline 521 engages selectively with an outer spline 241 of the driven sprocket wheel 24.

Accordingly, when the third engagement sleeve 52 is positioned in the four wheel driving condition "4W", as shown in FIG. 4, the inner spline 521 of the third engagement sleeve 52 engages with the outer spline 241 of the driven sprocket wheel 24. As a result, the output shaft 22 rotates with the driven sprocket wheel 24 and the rotation of the driven sprocket wheel 24 is transmitted to the output shaft 22 through the third engagement sleeve 52.

Conversely, when the third engagement sleeve 52 is positioned in the two wheel driving condition "2W", as shown in FIG. 4, the third engagement sleeve 52 is spaced apart from the driven sprocket wheel 24. As a result, the rotation of the driven sprocket wheel 24 is not transmitted to the output shaft 22.

Further, the driven sprocket wheel 24 includes a tapered portion 242, and a synchronizer ring 55 of a synchronizer clutch assembly is mounted on the tapered portion 242. The synchronizer clutch assembly includes the synchronizer ring 55, a shifting key 56 and key springs 57, and the synchronizer clutch assembly is located within an inner hole of the third engagement sleeve 52. When the second and third engagement sleeves 51 and 52 are shifted from the two wheel driving condition "2W" to the four wheel driving condition "4W" (i.e., before the second engagement sleeve 51 engages with the outer spline 231 of the driving sprocket wheel 23), the synchronizer clutch assembly synchronizes the driving and driven sprocket wheels 23 and 24 and the chain 25, with the output shaft 22, which is rotating in accordance with the speed of the vehicle.

The third engagement sleeve 52 and the synchronizer clutch assembly are effective even when a vehicle does not include a free-wheel hub mechanism which results in the driven wheels being free from a transmission of torque on a trans-axle shaft of the vehicle, or even when an operator does not cause the driven wheels to be free from the transmission of torque on the trans-axle shaft by operation of the free-wheel hub mechanism in the vehicle, which includes the free-wheel hub mechanism.

As shown in FIG. 12, oil fills the transfer casing 10 up to a predetermined level "F". Further, an oil strainer 145 is located within the transfer casing 10, and the oil strainer 145 communicates with the oil pump 141 through an oil passage defined between the left wall 111 of the transfer casing 10 and the pump body 14. Accordingly, a portion of the third engagement sleeve 52 and one of the engagement fingers 542 are located in the oil. Thus, due to better lubrication of the contact surface area between the engagement fingers 542 and the engagement groove 527 of the third engagement sleeve 52, only a small amount of friction results on the contact surface area.

In the two wheel driving condition, the third engagement sleeve 52 and the synchronizer clutch assembly can make the driving and driven sprocket wheels 23 and 24 and the chain 25 free from the transmission of torque on the output shaft 22. As a result, the third engagement sleeve 52 and the synchronizer clutch assembly can prevent the temperature in the transfer casing 10 from increasing, and also can prevent the oil in the transfer casing 10 from being churned by the driven sprocket wheel 24 and the chain 25. Further, they can prevent the driving and driven sprocket wheels 23 and 24 and the chain 25 from making noise and from being worn away.

Furthermore, a fin 524 is secured to an outer surface of the third engagement sleeve 52, and when the driven sprocket wheel 24 rotates with the output shaft 22, the fin 524 scatters the oil to the upper members located within the transfer casing 10.

As shown in FIG. 7, the second fork shaft 53 of the two-four wheel drive shift mechanism 50 is located parallel to the first fork shaft 42 of the high-low speed shift mechanism 40, and the second shift fork 54 is slidably mounted on an intermediate portion of the second fork shaft 53.

The second fork shaft 53 is slidably mounted on the left and right walls 111 and 121 of the transfer casing 10. The second shift fork 54 is biased to the left by a spring 58. A shift head 531 projects in the lateral direction of the second fork shaft 53, and the second shift fork 54 is in contact with a right end of the shift head 531 of the second fork shaft 53. A retainer 581 is prevented from moving on the second fork shaft 53 by a stop member 59, and the spring 58, and the spring 58 is located between the retainer 581 and the second shift fork 54.

Figure 8:
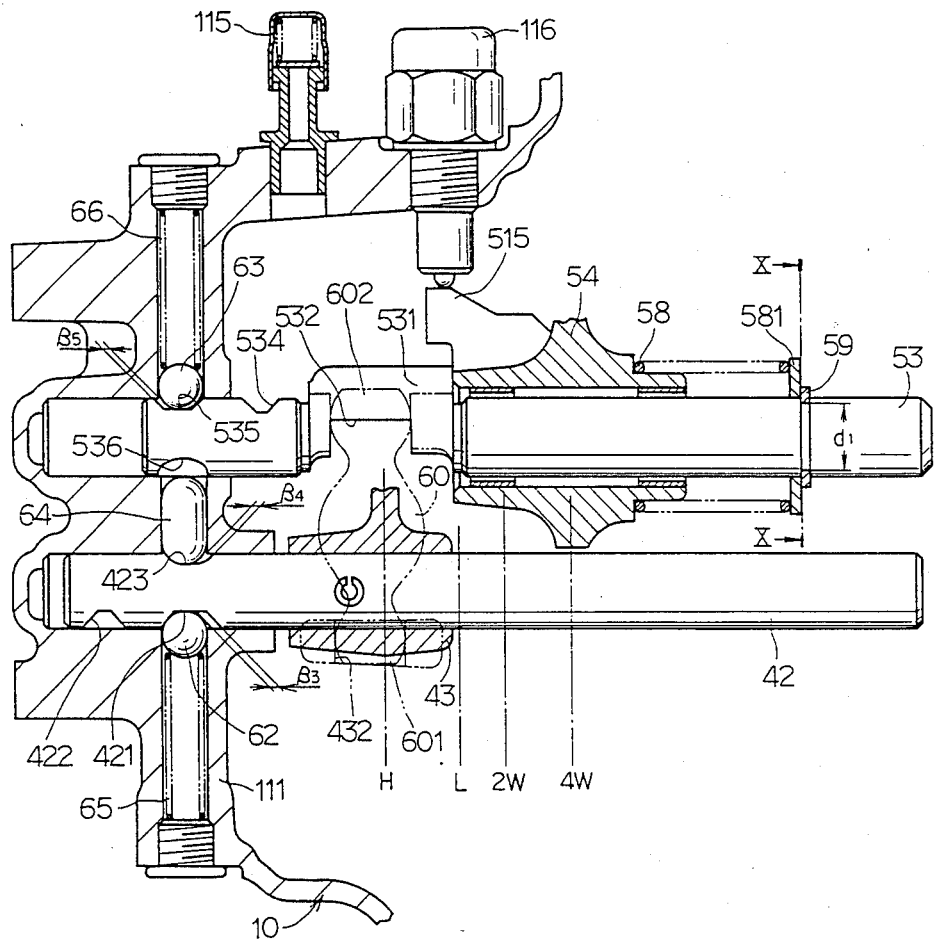
FIG. 8 is an enlarged cross-sectional view of the components shown in FIG. 7, wherein the stop member is positioned at the tentative position.
Figure 9:
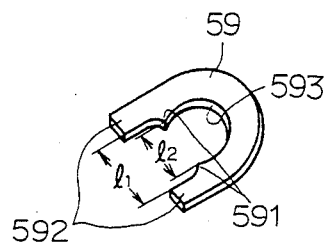
FIG. 9 is an enlarged perspective view of the stop member.
Figure 10:
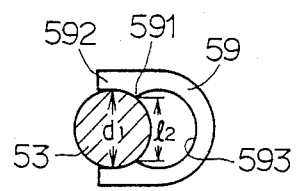
FIG. 10 is a cross-sectional view of the second fork shaft taken along the line X—X in FIG. 8, wherein the stop member is positioned at the tentative position.

As shown in FIG. 9, the stop member 59 includes a tentative holding portion 592 and a firmly gripping portion 593. The tentative holding portion 592 comprises a pair of legs and the firmly gripping portion 593 includes a pair of inner projections 591. As shown in FIGS. 8 and 10, the stop member 59 is inserted into a peripheral groove formed on the second fork shaft 53 and the stop member 59 is positioned at a tentative position. When the stop member 59 is inserted at the tentative position, it is necessary to push the stop member 59 by a first force. As shown in FIG. 10, in this condition, the pair of inner projections 591 are in contact with the second fork shaft 53 (i.e., the pair of inner projections 591 temporarily prevents the stop member 59 from being further inserted into the firmly gripping portion 593). The pair of legs of the tentative holding portion 592 are spaced apart form each other by a first length "$l_1$", and a diameter "$d_1$" of the peripheral groove is slightly greater than or equal to the first length "$l_1$" (e.g., if "$d_1$" is 13.2 mm, then "$l_1$" would typically be 13.0 mm). Further, the pair of legs are longer than a radius "$d_{\frac{1}{2}}$" of the peripheral groove. (e.g., if "$d_1$" is 13.2 mm, then a length of the leg is 7.3 mm). Accordingly, the stop member 59 is secured tentatively to the second fork shaft 53.

Figure 5:
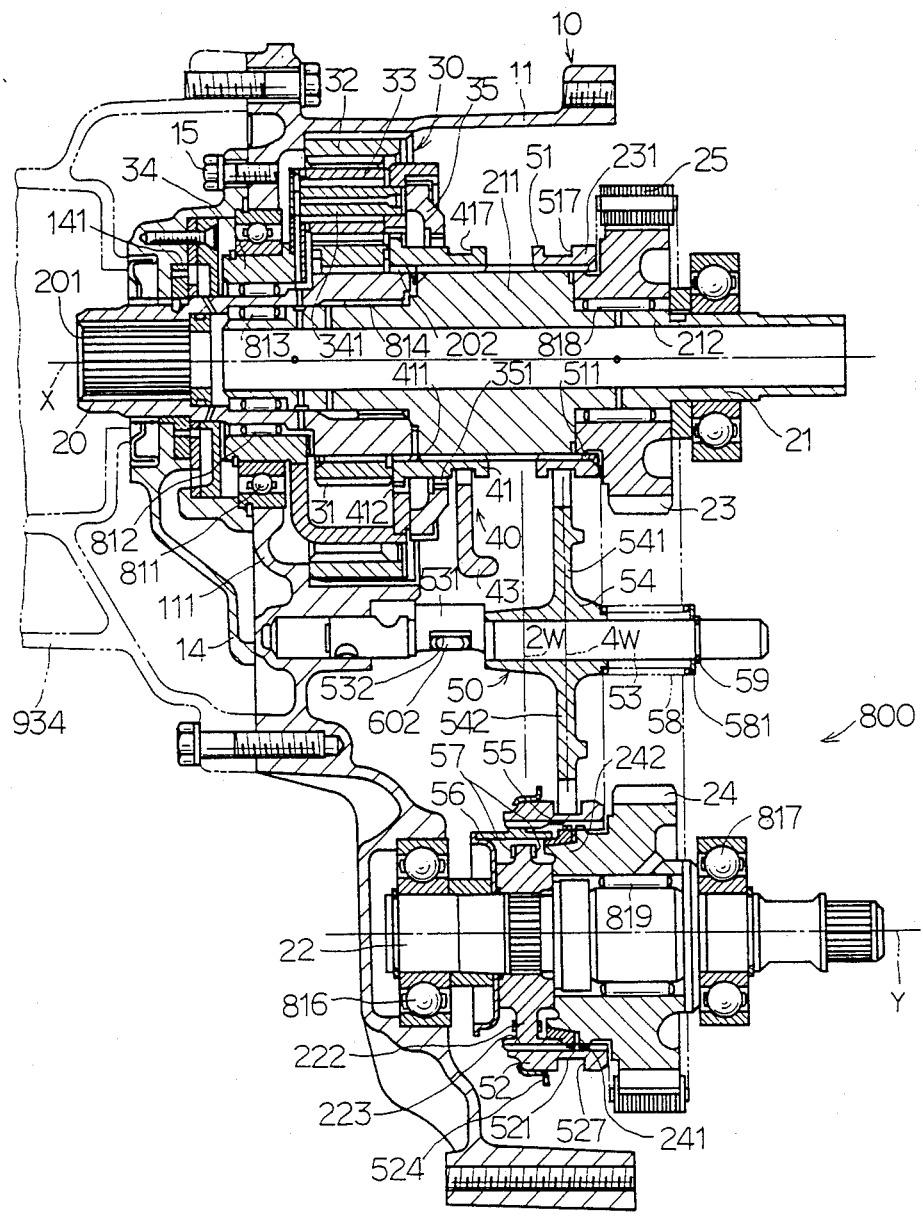
FIG. 5 is an enlarged cross-sectional view of the transfer casing shown in FIG. 4, wherein a right casing, an extension housing and a bevel driving gear are not secured, and a stop member is positioned at a tentative position.

FIGS. 5, 8 and 10 show a condition wherein the right casing 12, the extension housing 16 and the protector plate 18 are not fixed to the left casing 11 and wherein the bevel driving gear 223 is not fixed to the output shaft 22. In this condition, when the stop member 59 is positioned at the tentative position on the second fork shaft 53, the second shift fork 54 and the second and third engagement sleeves 51 and 52 are moved together in order to check for smooth movements of the second shift fork 54 and the second and third engagement sleeves 51 and 52.

When it is determined that the second shift fork 54, the second engagement sleeve 51, or the third engagement sleeve 52, do not move smoothly on the second fork shaft 53, the second input shaft 21, or the output shaft 22, respectively, the stop member 59 can be easily removed from the second fork shaft 53 and the spatial relationships between the second and third engagement sleeves 51 and 52, the second shift fork 54, the second fork shaft 53, the second input shaft 21, the output shaft 22 and the spring 88 can be readjusted without difficulty.

Figure 11:
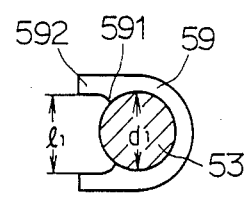
FIG. 11 is a cross-sectional view of the second fork shaft taken along the line XI—XI in FIG. 7, wherein the stop member is positioned at the fixed position.

As shown in FIGS. 7 and 11, the stop member 59 is subsequently further inserted into the peripheral groove of the second fork shaft 53 after it has been determined that there are smooth movements of the second shift fork 54 and the second and third engagement sleeves 51 and 52, thus positioning the stop member 59 at a firmly gripping position. When the stop member 59 is further inserted it is necessary to push the stop member 59 by a second force which is greater than the first force. The pair of inner projections 591 of the stop member 59 are spaced apart from each other by a second length "$l_2$", and the second length "$l_2$" is smaller than the first length "$l_1$" of the stop member 59 and is smaller than the diameter "$d_1$" of the second fork shaft 53. (e.g., if "$d_1$" is 13.2 mm and "$l_1$" is 13.0 mm, then "$l_2$" would typically be 11.3 mm). Accordingly, the stop member 59 is firmly secured to the second fork shaft 53.

After the stop member 59 is positioned at the firmly gripping position, the right casing 12, the extension housing 16 and the protector plate 18 are fixed to the left casing 11 and the bevel driving gear 223 is also fixed to the output shaft 22.

As shown in FIG. 7, an engagement recess 532 is defined within the shift head 531 of the second fork shaft 53, and a second end 602 of the swing arm 60 is inserted into, and engages with, the engagement recess 532 of the second fork shaft 53.

As shown in FIG. 12, the second shift fork 54 includes two pairs of engagement fingers 541 and 542 which extend, in the lateral direction of the second fork shaft 53, to the annular grooves 517 and 527 of the second and third engagement sleeves 51 and 52, respectively. Accordingly, when the second shift fork 54 is moved in the axial direction of the second fork shaft 53, the second and third engagement sleeves 51 and 52 are forced to move, respectively, in the axial directions of the second input shaft 21 and the output shaft 22.

Figure 13:
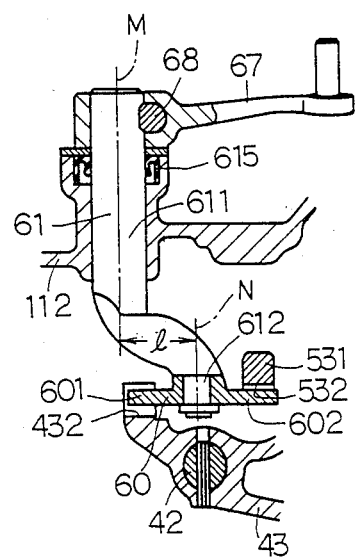
FIG. 13 is an enlarged cross-sectional view of the components of the high-low speed drive shift mechanism and the two-four wheel drive shift mechanism, wherein both ends of a swing arm are located respectively within engagement recesses of the first and second fork shafts.

Furthermore, as shown in FIGS. 7 and 13, the swing arm 60 includes a first end 601, and the first end 601 is inserted into, and engages with, an engagement recess 432 of the first shift fork 43. The swing arm 60 is rotatably mounted on an eccentric shaft portion 612 of a rod 61, and the main shaft portion 611 of the rod 61 is rotatably mounted on a boss portion 112 of the transfer casing 10. A sealing member 615 is located between the boss portion 112 and the main shaft portion 611 of the rod 61, and the sealing member 615 prevents oil from leaking out from the transfer casing 10. The eccentric shaft portion 612 extends parallel to the main portion 611, and the eccentric shaft portion 612 is spaced apart from the main shaft portion 611 by a distance "l" (i.e., the distance "l" being defined as a distance between a central axis "M" of the main shaft portion 611 and a central axis "N"). An end of the main shaft portion 611 of the rod 61 projects out of the transfer casing 10, and the end of the rod 61 is secured to an outer lever 67 by a tapered pin 68.

As shown in FIG. 12, the outer lever 67 is connected to a transfer lever 70 by a push-pull cable 69. The transfer lever 70 is located in a passenger compartment of the vehicle and when the transfer lever 70 is moved in the longitudinal direction of the vehicle, the push-pull cable 69 forces the outer lever 67 to move about the main shaft portion 611 of the rod 61, thereby rotating the rod 61.

As shown in FIG. 7, the first fork shaft 42 includes a first notch 421, a second notch 422 and a third notch 423, and a first locking ball 62 is selectively inserted into one of the first and second notches 421 and 422. The first locking ball 62 is biased to the first fork shaft 42 by a spring 65, which is located within the left wall 111 of the transfer casing 10.

The second fork shaft 53 includes a fourth notch 534, a fifth notch 535 and a sixth notch 536, and a second locking ball 63 is selectively inserted into one of the fourth and fifth notches 534 and 535. The second locking ball 63 is biased to the second fork shaft 53 by a spring 66, which is located within the left wall 111 of the transfer casing 10. An interlock pin 64 is selectively inserted into either the third notch 423 of the first fork shaft 42 or the sixth notch 536 of the second fork shaft 53.

A width of the first notch 421 of the first fork shaft 42 is greater than a width of the second notch 422 by a third distance "$\beta_3$", so that even when the first locking ball 62 is inserted into the first notch 421, the first locking ball 62 is spaced apart from a right side of the first notch 421 by the third distance "$\beta_3$".

The third distance "$\beta_3$" is greater than or equal to the first gap "$\beta_1$", shown in FIG. 6, defined between the first engagement sleeve 41 and the sun gear 31 (e.g., the third distance "$\beta_3$" is typically between 1 mm and 2 mm in this embodiment). The first notch 421 is located between the second notch 422 and the first shift fork 43. The first notch 421 is spaced apart from the first shift fork 43 by a first predetermined length in the longitudinal direction of the first fork shaft 42. The third notch 432 is spaced apart from the first shift fork 43 by the first predetermined length in the longitudinal direction of the first fork shaft 42, and at an opposite side of the first fork shaft 42 in the lateral direction thereof against the first notch 421. A width of the third notch 423 is greater than a width of the interlock pin 64 by a fourth distance "$\beta_4$", so that even when the interlock pin 64 is inserted into the third notch 423, the interlock pin 64 is spaced apart from a right side of the third notch 423 by the fourth distance "$\beta_4$".

The fourth distance "$\beta_4$" is substantially the same length as the third distance "$\beta_3$" (i.e., $\beta_3 \approx \beta_4 > \beta_1$). A width of the fifth notch 535 of the second fork shaft 53 is greater than a width of the fourth notch 534 by a fifth distance "$\beta_5$", so that even when the second locking ball 63 is inserted into the fifth notch 535, the second locking ball 63 is spaced apart from a left side of the fifth notch 535 by the fifth distance "$\beta_5$".

The fifth distance "$\beta_5$" is greater than or equal to the second gap "$\beta_2$", shown in FIG. 6, which is the distance between the second engagement sleeve 51 and the driven sprocket wheel 23 (e.g., the fifth distance "$\beta_5$" is typically between 1 mm and 2 mm in this embodiment). The fourth notch 534 is located between the fifth notch 535 and the shift head 531. The fifth notch 535 is spaced apart from the shift head 531 by a second predetermined length in the longitudinal direction of the second fork shaft 53.

The sixth notch 536 spaced apart from the shift head 531 by the second predetermined length in the longitudinal direction of the second fork shaft 53, and at an opposite side of the second fork shaft 53 in the lateral direction thereof, against the fifth notch 535.

The sixth notch 536 of the second fork shaft 53 faces the third notch 423 of the first fork shaft 42, and an aperture is defined between the sixth notch 536 and the third notch 423 within the left wall 111 of the transfer casing 10. The interlock pin 64 is located within the aperture, and the interlock pin 64 selectively engages with either the sixth notch 536 of the second fork shaft 53 or the third notch 423 of the first fork shaft 42.

When the transfer lever 70 is positioned at a first position "H4", as shown in FIG. 12, then, as shown in FIG. 7, the first fork shaft 42 is positioned in the high speed driving condition "H" and the second fork shaft 53 is positioned in the four wheel driving condition "4W". Concurrently, as shown in FIG. 6, when the first engagement sleeve 41 is positioned in the high-speed driving condition "H", and when the second and third engagement sleeve 51 and 52 are positioned in the four wheel driving condition "4W", the first input shaft 20 is securely connected to the second input shaft 21, the second input shaft 21 is securely connected to the driving sprocket wheel 23, and the output shaft 22 is securely connected to the driven sprocket wheel 24.

Accordingly, the vehicle may drive at a high speed in the four wheel driving condition.

In this condition, a left end of the first engagement sleeve 41 is spaced apart from a right end of the sun gear 31 of the epicycle reduction gear unit 30 by the first distance "$\beta_1$", and the first fork shaft 42 is prevented from moving to the right in the axial direction thereof by the first locking ball 62.

Concurrently, a right end of the second engagement sleeve 51 is spaced apart from a left end of the driving sprocket wheel 23 by the second distance "$\beta_2$", and a right end of the third engagement sleeve 52 is spaced apart from a left end of the driven sprocket wheel 24 by the second distance "$\beta_2$". The second fork shaft 53 is prevented from moving to the left in the axial direction thereof by the second locking ball 63.

It is apparent to those skilled in the art that the second fork shaft 53 is prevented from moving to the right by contact of the stop member 59 with the right wall 121 of the transfer casing 10.

Further, as shown in FIG. 7, an air bleed valve 115 and a detecting switch 116 for detecting the four wheel driving condition "4W", are located on the left wall 111 of the transfer casing 10. The detecting switch 116 includes a contact point which is in contact with a projection 515 of the second shift fork 54 in the four wheel driving condition "4W".

Figure 14:
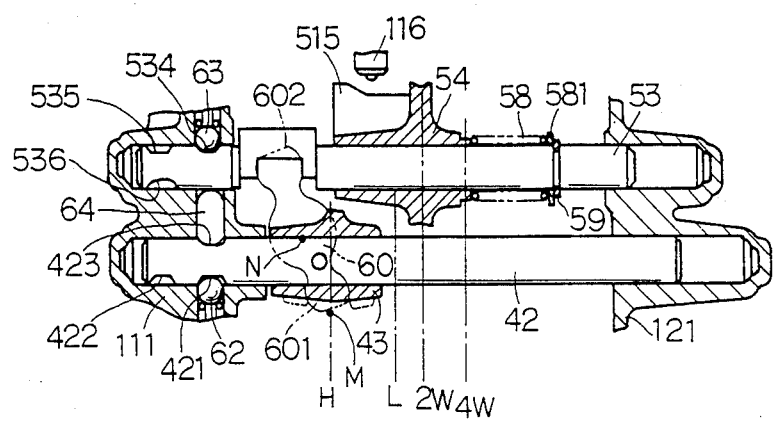
FIG. 14 is an enlarged cross-sectional view of the components shown in FIG. 7, wherein the first fork shaft is positioned in a high speed drive condition and the second fork shaft is positioned in a two-wheel drive condition.

When the transfer lever 70, as shown in FIG. 12, is positioned at a second position "H2", the push-pull cable 69 and the outer lever 67 are pulled, whereby the main shaft portion 611 of the rod 61 rotates about the central axis "M". When the main shaft portion 611 rotates in the counter-clockwise direction "A", The switch arm 60 swings in the counter-clockwise direction "A" about the central axis "M". As a result, the second end 602 of the swing arm 60 forces the second fork shaft 53 to move to the left, as shown in FIG. 14, and the second fork shaft 53 changes from the four wheel driving condition "4W" to the two wheel driving condition "2W". In this condition, when a large torque is not applied to the second and third engagement sleeves 51 or 52, the second shift fork 54 is immediately pushed with the second and third engagement sleeves 51 and 52 to the two wheel driving condition "2W" by the spring 58. If a large torque is applied to the second and third engagement sleeves 51 and 52, after the large torque is lessened, the second shift fork 54 is pushed with the second and third engagement sleeves 51 and 52 to the two wheel driving conditions "2W" by the spring 58.

Accordingly, the second and third engagement sleeves 51 and 52 move to the two wheel driving condition "2W", as shown in FIG. 4, and then the second input shaft 21 and the output shaft 22 are respectively disconnected from the driving and driven sprocket wheels 23 and 24. Therefore, the vehicle may drive at a high speed in the two wheel driving condition.

Further, the contact point of the detecting switch 116 is not in contact with the projection 515 of the second shift fork 54.

In FIG. 14, the first fork shaft 42 is prevented from moving in the axial direction thereof by the interlock pin 64 and the first locking ball 62, so that when the transfer lever 70 is moved from the second position "H2" to the first position "H4", as shown in FIG. 12, the second end 602 of the swing arm 60 swings in the clockwise direction about the central axis "M" of the main shaft portion 611 of the rod 61. As a result, the second fork shaft 53 moves in the axial direction to the right from the two wheel driving condition "2W", as shown in FIG. 14, to the four wheel driving condition "4W", as shown in FIG. 7.

Figure 15:
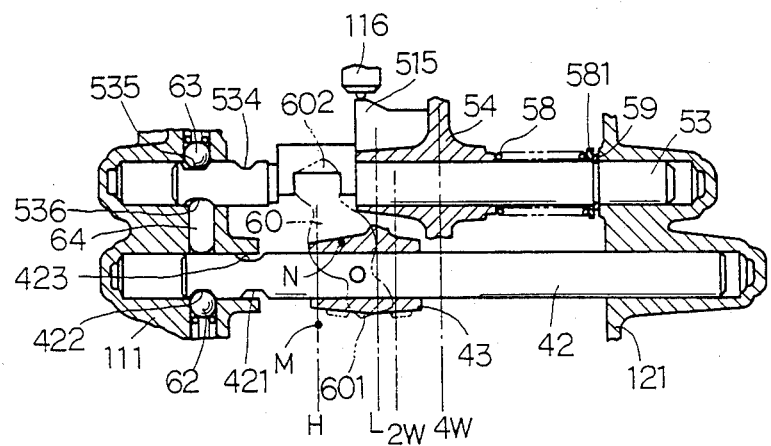
FIG. 15 is an enlarged cross-sectional view of the components shown in FIG. 7, wherein the first fork shaft is positioned in a low speed drive condition and the second fork shaft is positioned in a four wheel drive condition.

Moreover, when the transfer lever 70 is moved from the first position "H14" to a third position "L4", as shown in FIG. 12, the push-pull cable 69 and the outer lever 67 are pulled, the main shaft portion 611 of the rod 61 rotates in the clockwise direction "B", as shown in FIG. 7, about the central axis "M" thereof, and concurrently the interlock pin 64 is inserted into the sixth notch 536 of the second fork shaft 53, whereby, the eccentric shaft portion 612 moves in the clockwise direction "B". However, the second fork shaft 53 is prevented from moving to the right by the interlock pin 64 and the second locking ball 63. Accordingly, the swing arm 60 rotates in the counter-clockwise direction about the central axis "N" of the eccentric shaft portion 612, whereby, the first end 601 of the swing arm 60 swings in the counter-clockwise direction about the second end 602 thereof and the engagement recess 532. Therefore, the first shift fork 43 and the first fork shaft 42 are moved to the right from the high speed driving condition "H" to the low-speed driving condition "L", as shown in FIG. 15. As a result, the first engagement sleeve 41 is moved to the right.

The outer spline 412 of the first engagement sleeve 41 engages with the inner spline 351 of the gear plate 35, and the inner spline 411 of the first engagement sleeve 41 disengages from the outer spline 202 for the first input shaft 20. The first input shaft 20 is connected to the second input shaft 21 through the epicycle reduction gear unit 30.

Accordingly, the vehicle may drive at a low speed in the four wheel driving condition.

Furthermore, the contact point of the detecting switch 116 is in contact with the projection 515 of the second shift fork 54.

Further, as shown in FIG. 15, the interlock pin 64 is inserted into the sixth notch 536, so that the second fork shaft 53 is prevented from moving to the left in the axial direction thereof. As a result, when the transfer lever 70, as shown in FIG. 12, is moved from the third position "L4" to the first position "H4", the first end 601 of the swing arm 60 rotates in the clockwise direction about the second end 602 of the swing arm 60 from the low-speed driving condition "L" to the high speed driving condition "H", as shown in FIG. 7.

As shown in FIGS. 16 through 23, a plurality of disengagement preventing mechanisms are respectively provided between the first input shaft 20 and the first engagement sleeve 41 and between the second engagement sleeve 51 and the driving sprocket wheel 23. The disengagement preventing mechanism prevent the first and second engagement sleeves 41 and 51 from disengaging, respectively, from the first input shaft 20 and the driving sprocket wheel 23 at the respective driving conditions.

As shown in FIGS. 16 through 19, a first disengagement preventing mechanism 701 includes a pair of chamfers 203 and a pair of tapered surfaces 204 on the outer spline 202 of the first input shaft 20, and a pair of chamfers 413 and a pair of tapered surfaces 414 on the inner spline 411 of the first engagement sleeve 41.

The pair of chamfers 203 are defined on a right end of the outer spline 202, and the pair of tapered surfaces 204 are defined in the vicinity of the pair of chambers 203. Each of the tapered surfaces 204 is inclined with respect to a longitudinal center line of the outer spline 202 by a first angle $\theta_1$.

Additionally, the pair of chamfers 413 are defined on a left end of the inner spline 411, and the pair of tapered surfaces 414 are defined in the vicinity of the pair of chambers 413. Each of the tapered surfaces 414 is inclined with respect to a longitudinal center line of the inner spline 411 by a second angle $\theta_2$.

When the outer spline 202 of the first input shaft 20 engages with the inner spline 411 of the first engagement sleeve 41, and when torque is applied to the first input shaft 20, each of the tapered surfaces 204 of the first input shaft 20 is in contact with each of the tapered surfaces 414 of the first engagement sleeve 41, and the first engagement sleeve 41 is driven. The tapered surfaces 414 of the first engagement sleeve 41 are inclined by the second angle $\theta_2$, so that when torque is applied to the first input shaft 20, such torque causes a divided thrust force directed to the first input shaft 20 on the first engagement sleeve 41.

Accordingly, when the torque is applied to the first input shaft 20, the first engagement sleeve 41 cannot disengage from the first input shaft 20 due to the divided thrust force.

In a similar manner, as shown in FIGS. 20 through 23, a second disengagement preventing mechanism 702 includes a pair of chamfers 233 and a pair of tapered surfaces 234 on the outer spline 231 of the driving sprocket wheel 23, and a pair of chamfers 513 and a pair of tapered surfaces 514 on the inner spline 511 of the second engagement sleeve 51. The pair of chamfers 233 are defined on a left end of the outer spline 231, and the pair of tapered surfaces 234 are defined in the vicinity of the pair of chamfers 233. Each of the tapered surfaces 234 is inclined with respect to a longitudinal center line of the outer spline 231 by a fourth angle $\theta_4$.

Further, the pair of chamfers 513 are defined on a right end of the inner spline 511, and the pair of tapered surfaces 514 are defined in the vicinity of the pair of chambers 513. Each of the tapered surfaces 514 is inclined with respect to a longitudinal center line of the inner spline 511 by a third angle $\theta_3$.

When the outer spline 231 of the driving sprocket wheel 23 engages with the inner spline 511 of the second engagement sleeve 51, and when torque is applied to the second engagement sleeve 51 through the second input shaft 21, each of the tapered surfaces 234 of the driving sprocket wheel 23 is in contact with each of the tapered surfaces 514 of the second engagement sleeve 51, and the driving sprocket wheel 23 is driven.

The tapered surfaces 234 of the driving sprocket wheel 23 are inclined by the fourth angle $\theta_4$, so that when torque is applied to the second engagement sleeve 51, such torque causes a divided thrust force directed to the driving sprocket wheel 23 on the second engagement sleeve 51.

Accordingly, when torque is applied to the second engagement sleeve 51, the second engagement sleeve 51 cannot disengage from the driving sprocket wheel 23.

Further, the disengagement preventing mechanisms are provided between the inner spline 351 of the gear plate 35 and the outer spline 412 of the first engagement sleeve 41 and between the outer spline 241 of the driven sprocket wheel 24 and the inner spline 521 of the third engagement sleeve 52.

Figure 16:
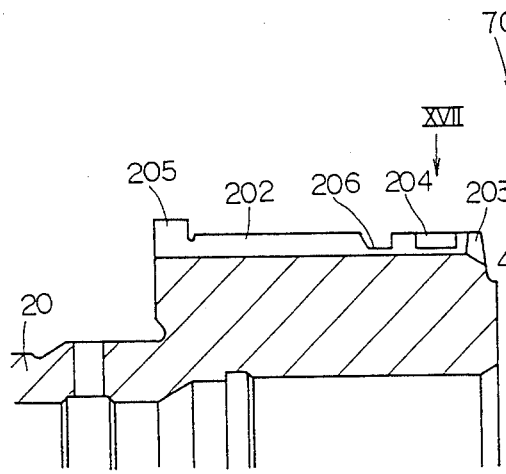
FIG. 16 is a further enlarged cross-sectional view of an input shaft which engages with the first engagement sleeve.
Figure 18:
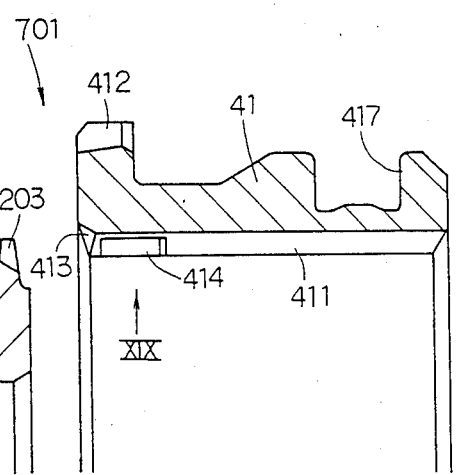
FIG. 18 is a further enlarged cross-sectional view of the first engagement sleeve which engages with the input shaft shown in FIG. 16.
Figure 17:
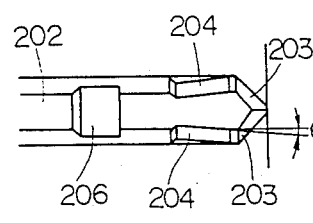
FIG. 17 is a top plane view of the input shaft shown in FIG. 16, as viewed from XVII in FIG. 16.
Figure 19:
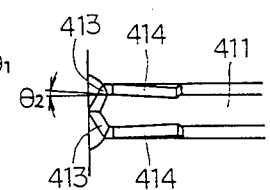
FIG. 19 is an internal plane view of the first engagement sleeve shown in FIG. 18, as viewed from XIX in FIG. 18.
Figure 32:
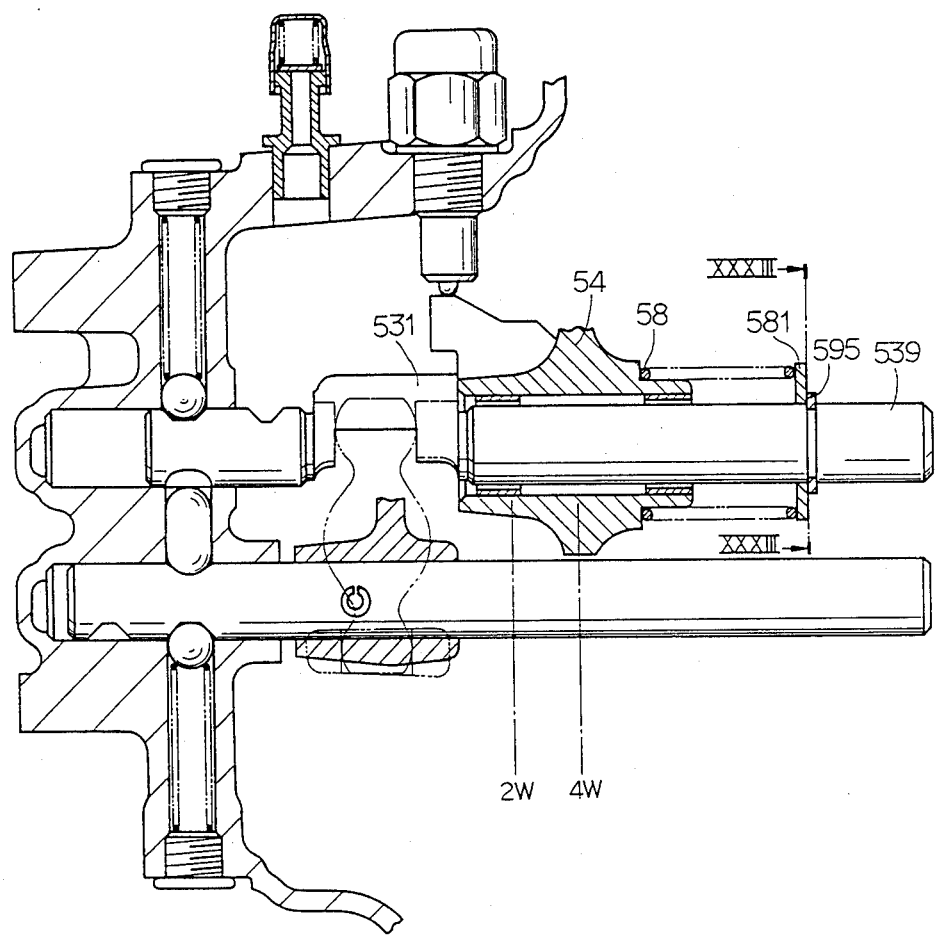
FIG. 32 is a cross-sectional view of components of a conventional two-four wheel drive shift mechanism, wherein the first conventional stop member is fixed to a conventional second fork shaft.
Figure 30:
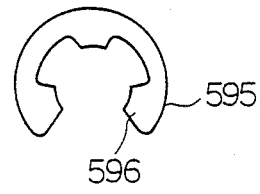
FIG. 30 is a plane view of a first conventional stop member.
Figure 31:
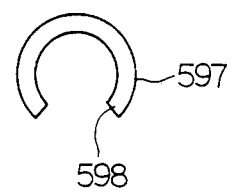
FIG. 31 is a plane view of a second conventional stop member.
Figure 33:
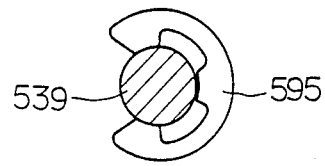
FIG. 33 is a cross-sectional view of the conventional second fork shaft taken along the line XXXIII—XXXIII in FIG. 32.

Furthermore, as shown in FIGS. 16 and 17, a projection 205 and a groove 206 are defined on the outer spline 202 of the first input shaft 20. The projection 205 is defined at a left end of the outer spline 202, and the groove 206 is defined in the vicinity of the tapered surfaces 204. The sun gear 31 of the epicycle reduction gear unit 30 is secured to the first input shaft 20 by the projection 205 and a snap ring, which is located within the groove 206.

As shown in FIG. 6, normally the first distance "$\beta_1$" is defined between the sun gear 31 of the epicycle reduction gear unit 30 and the first engagement sleeve 41, and in the high-speed driving condition "H", the first engagement sleeve 41 is forced to move to the left by the divided thrust force caused by the disengagement preventing mechanism 701. The thrust force is transmitted to the first input shaft 20 through the projection 205 thereof, as shown in FIG. 16; further, the thrust force is transmitted to the pump body 14, which is secured to the transfer casing 10 through a thrust bearing 821, the planet carrier 34 and the bearing 811.

In a similar manner, normally the second distance "$\beta_2$" is defined between the second engagement sleeve 51 and the driving sprocket wheel 23, and in the four-wheel driving condition "4W", the second engagement sleeve 51 is forced to move to the right by the divided thrust force caused by the disengagement preventing mechanism 702. The thrust force is transmitted from the driving sprocket wheel 23 to the extension housing 16 secured to the transfer casing 10 through a spacer 825 and the bearing 815.

Further, a distance is defined between the third engagement sleeve 52 and the driven sprocket wheel 24, and in a similar manner the thrust force is transmitted to the transfer casing 10.

Furthermore, a thrust bearing 822 is located between the first input shaft 20 and the second input shaft 21, and a pair of thrust bearings 823 and 824 are located between the plurality of planet gears 33 and the planet carrier 34.

Gaps defined between the engagement fingers 431, 541 and 542 of the first and second fork shafts 43 and 53, and the engagement grooves 417, 517 and 527 of the first-through-third engagement sleeves 41, 51 and 52, are smaller than the first and second distances "$\beta_1$" and "$\beta_2$".

As mentioned above, the disengagement preventing mechanism 701 is provided between the first engagement sleeve 41 of the high-low speed shift mechanism 40 and the first input shaft 20, and the disengagement preventing mechanism 702 is provided between the second engagement sleeve 51 of the two-four wheel drive shift mechanism 50 and the driving sprocket wheel 23.

Accordingly, when torque is applied to the first input shaft 20 and the second input shaft 21, the first and second engagement sleeves 41 and 51 are forced to move to the first input shaft 20 and the driving sprocket wheel 23, respectively, by the divided thrust forces exerted on the tapered surfaces 414 and 514 of the first and second engagement sleeves 41 and 51.

As a result, the first shift fork 43 and the first fork shaft 42 are forced to move against the locking ball 62, which is biased by the spring 65. As shown in FIG. 7, the third distance "$\beta_3$" is defined between the first locking ball 62 and the right side of the first notch 421, and the fourth distance "$\beta_4$" is defined between the interlock pin 64 and the right side of the third notch 423, so that the first fork shaft 42 can move to the left in the longitudinal direction thereof without a large amount of friction.

Additionally, the first end 601 of the swing arm 60 is rotated in the clockwise direction "B", and then the second end 602 of the swing arm 60 swings in the clockwise direction.

As result, the second fork shaft 53 is forced to move to the right. In this condition, the fifth distance "$\beta_5$" is defined between the second locking ball 63 and the left side of the fifth notch 535, so that the second fork shaft 53 can move to the right without any large amount of friction.

Moreover, the second shift fork 54 is moved on the second fork shaft 53 to the right by the divided thrust force.

FIGS. 24 through 25 disclose a second embodiment of a stop member according to the present invention, wherein a stop member 501 has a tentative holding portion 503 and a fixed portion 504. The tentative holding portion 503 comprises a pair of legs and the tentative holding portion 503 includes a pair of rounded ends 507 and a pair of first outer projections 505. The fixed portion 504 includes a pair of inner projections 502 and the pair of second outer projections 505 which extend from the tentative holding portion 503. The rounded ends 507 of the stop members 501 provide an easy access to the second fork shaft 53.

As shown in FIG. 25, the stop member 501 is inserted into the peripheral groove of the second fork shaft 53 and the stop member 501 is positioned at a tentative position. The pair of legs of the tentative holding portion 503 are spaced apart from each other by the first length "$l_1$" which is slightly smaller than or equal to the diameter "$d_1$" of the peripheral groove of the second fork 53 (e.g., if "$d_1$" is 13.2 mm, then "$l_1$" would typically be 13.2 mm). Further, the pair of legs are longer than a radius "$d_{\frac{1}{2}}$ of the peripheral groove. (e.g., if "$d_1$" is 13.0 mm, then a length of the leg is 10.0 mm). Accordingly, the stop member 501 is secured tentatively to the second fork shaft 53 by the tentative holding portion 503 thereof. The pair of first outer projections 505 extend outwardly from the stop member 501 and when the stop member 501 is positioned at the tentative holding position, the first outer projections 505 are in contact with the retainer 581 mounted slidably on the second fork shaft 53. Accordingly, the spring 58 is located between the retainer 581 and the second shift fork 54 and the spring 58 can force the second shift fork 54 to move to the shift head 531 of the second fork shaft 53.

As shown in FIG. 26, the stop member 501 is positioned at a firmly gripping position and the stop member 501 is firmly secured to the second fork shaft 53, become the pair of inner projections 502 of the stop member 501 are spaced apart from each other by the second length "$l_2$", which is smaller than the first length "$l_1$" of the tentative holding portion 503 of the stop member 501 and is smaller than the diameter "$d_1$" of the second fork shaft 53 (e.g., if "$d_1$" is 13.2 mm and "$l_1$" is 13.2 mm, then "$l_2$" would typically be 11.5 mm).

Even when the stop member 501 is positioned at the firmly gripping position, the pair of outer projections 505 are in contact with the retainer 581.

Further, FIGS. 27 through 29 disclose a third embodiment of a stop member according to the present invention, wherein a stop member 555 has a tentative holding portion 557 and a fixed portion 558. The tentative holding portion 557 comprises a pair of legs which have a plurality of inner teeth 559. The fixed portion 558 includes a pair of inner projections 556.

As shown in FIGS. 28, the stop member 555 is inserted into the peripheral groove of the second fork shaft 53 and the stop member 555 is positioned at a tentative position. The inner teeth 559 of the pair of legs of the tentative holding portion 557 are spaced apart from each other by the first length "$l_1$" which is slightly larger than or equal to the diameter "$_1$" of the peripheral groove of the second fork shaft 53 (e.g., if "$d_1$" is 13.2 mm, then "$l_1$" would typically be 13.0 mm). Further, the pair of legs are longer than a radius "$d_1$" of the peripheral groove. (e.g., if "$l_1$" is 13.2 mm, then a length of the leg is 13.0 mm). Accordingly, the stop member 555 is secured tentatively to the second fork shaft 53 by the inner 559 thereof.

As shown in FIG. 29, the stop member 555 is positioned at a firmly gripping position and the stop member 555 is firmly secured to the second fork shaft 53, because the pair of inner projection 556 of the stop member 555 are spaced apart from each other by the second length "$l_2$", which is smaller than the first length "$l_1$" of the stop member 555, and is smaller than the diameter "$d_1$" of the second fork shaft 53 (e.g., if "$l_1$" is 13.0 mm, then "$l_2$" would typically be 11.3 mm).

As described herein, the present invention overcomes the shortcomings of the known art by providing an apparatus for assembling a four-wheel vehicle drive mechanism which can be easily assembled and removed.

While the present invention has been described in its preferred embodiments, it is to be understood that the invention is not limited thereto, and may be otherwise embodied within the scope of the following claims.

What is claimed is:

1. A four-wheel drive system for use in a vehicle including a first and a second pair of road wheels, an engine including an output shaft, and a transmission including input and output shafts, the input shaft of the transmission being selectively connected to the output shaft of the engine, the output shaft of the transimssion selectively being in driving engagement with the input shaft of the transmission, the four-wheel drive system comprising:

a first spline member which is rotatable about a first rotational axis, said first spline member being driven by the output shfat of the transmission;

a second spline member which is rotatable about the first rotational axis of said first spline member, said second spline member being located adjacent to said first spline member, said second spline member including a first engagement means and a first disengagement preventing means;

an engagement sleeve member being slidably mounted on said first spline member, said engagement sleeve member including a second engagement means and a second disengagement preventing means, the second engagement means of said engagement sleeve member selectively engaging with the first engagement means of said second spline member, the second disengagement preventing means of the engagement sleeve member selectively engaging with the first disengagement preventing means of the second spline member, said engagement sleeve member being selectively positioned at one of an engagement position and a disengagement position;

a shaft member being located parallel to the first rotational axis of said first spline member, said shaft member being selectively positioned at one of a first position and a second position, the first position of said shaft member corresponding to the engagement position of said engagement sleeve member, the second position of said shaft member corresponding to the disengagement position of said engagement sleeve member, said shaft member including a projection, a first notch and a second notch, a width of the first notch being larger than a width of the second notch;

a locking member being biased toward said shaft member, said locking member being selectively inserted in one of the first and second notches of said shaft member, such that when the shaft member is positioned at the first position, the locking member is inserted into the first notch of said shaft member and a first space is defined in the longitudinal direction of said shaft member between a side of the locking member and a corresponding side of the first notch, and when the shaft member is positioned at the second position, the locking member is inserted into the second notch of said shaft member and two sides of the locking member are in contact with corresponding sides of the second notch;

a fork member being slidably mounted on said shaft member, said fork member including an engagement finger, the engagement finger engaging with said engagement sleeve member, the fork member being selectively positioned at one of a third position and a fourth position, the third position of the fork member corresponding to the first position of the shaft member, and the fourth position of the fork member corresponding to the second position of the shaft member;

a biasing means which forces the fork member to move toward the projection of the shaft member; and a stop member being secured to the shaft member, the stop member being located adjacent to the bising means, the stop member including a tentative holding portion and a firmly gripping portion, such that when the stop member contacts the shaft member at the tentative holding portion thereof, such contact is temporary and the stop member can be easily removed from the shaft member to adjust spatial relationships between the engagement sleeve member, the fork member and the shaft member, and when the stop member contacts the shaft member at the firmly gripping portion thereof, the stop member is firmly secured to the shaft member to prevent the engagement sleeve member, the fork member and the shaft member from changing spatial relationships therebetween.

2. A four-wheel drive system of claim 1, wherein the stop member is selectively positioned at one of a tentative position and a fixed position on the shaft member, whereby when the stop member is positioned at the tentative position, the tentative holding portion of the stop member is in contact with the shaft member, and when the stop member is positioned at the fixed position, the firmly gripping portion of the stop member is in contact with the shaft member.

3. A four-wheel drive system of claim 2, wherein the tentative holding portion of the stop member comprises a pair of legs and the firmly gripping portion of the stop member comprises a pair of inner projections.

4. A four-wheel drive system of claim 3, wherein a first distance is defined between the pair of legs of the tentative holding portion and the first distance is less than a diameter of the shaft member.

5. A four-wheel drive system of claim 4, wherein a second distance is defined between the pair of inner projections and the second distance is less than said first distance of the tentative holding portion, such that the pair of inner projections prevent the shaft member from dropping out from the firmly gripping portion of the stop member.

6. A four-wheel drive system of claim 3, wherein when the stop member is positioned at the tentative position, the pair of inner projections are in contact with the shaft member, whereby the pair of inner projections temporally prevent the stop member from being further inserted into a groove defined on the shaft member.

* * * * *